Feb. 8, 1949.
C. F. ZIMMERMAN
2,460,867
VALVE CLOSURE
Filed May 31, 1945
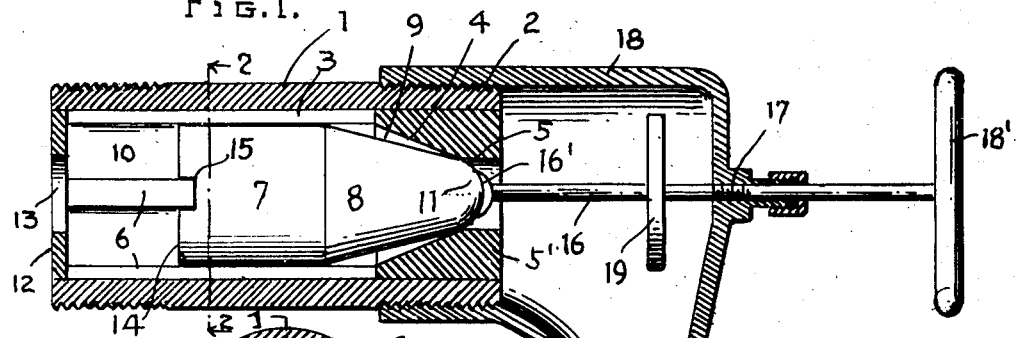
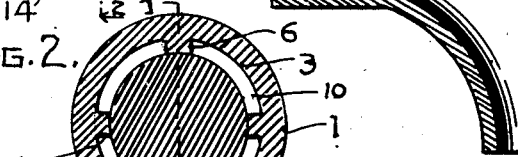
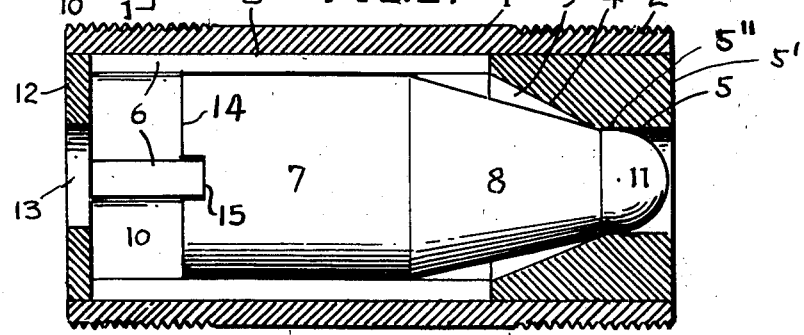
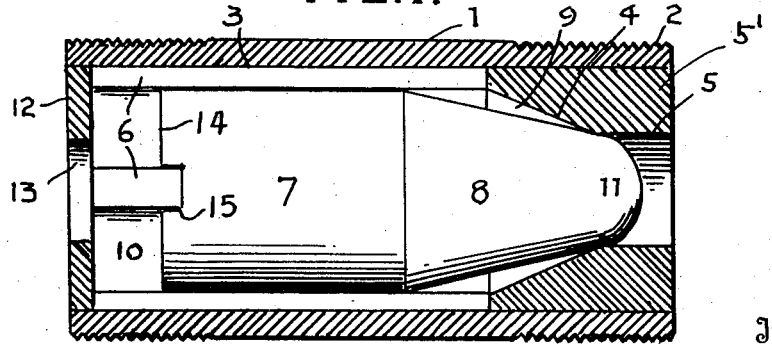
Inventor
Charles F. Zimmerman,
E. W. Anderson & Son.
By
Attorney Patented Feb. 8, 1949

2,460,867

UNITED STATES PATENT OFFICE 2,460,867

VALVE CLOSURE

Charles F. Zimmerman, Braddock Heights, Md., assignor of one-half to Walter J. Davis, Frederick, Md.

Application May 31, 1945, Serial No. 596,873

4 Claims. (Cl. 251—27)

The invention relates to valve closures for controlling the passage of fluid, such as the valve closure of an ordinary water faucet, the flush tank of a water closet, the air valve of a pneumatic tire, etc. An object of the invention is to provide an improved device of this description whereof the valve will become seated by fluid pressure without necessity of the use of springs, or other mechanical pressure. Another object is to provide an improved device whereof the construction will be simplified and manufacture rendered more economical. Another object is to provide an improved device whereof the valve is the only element subject to any particular wear, and which valve will be durable and of long life and readily renewable at small cost. Another object is to provide an improved device capable of instantaneously cutting off the flow of the fluid and which will not be subject to leakage even with long use. Other objects and advantages will appear hereinafter or will be obvious.

The invention consists in the novel construction and combinations of parts as hereinafter set forth in the claims.

In the accompanying drawings,

Figure 1 is a central longitudinal section of the invention as applied to a water faucet, the section being taken on the line 1—1, Fig. 2.

Figure 2 is a transverse section on the line 2—2, Figure 1.

Figure 3 is a view similar to Figure 1, with the nozzle and push rod removed, and on a somewhat larger scale, the valve being shown as closed by fluid pressure.

Figure 4 is a view similar to Figure 3, the valve being shown in position just prior to being seated or closed by fluid pressure.

In these drawings, the numeral 1 designates the valve casing, which may be a short pipe fitting in the nature of a nipple, externally threaded at opposite ends at 2, for insertion in the pipe line, said valve casing having a cyilndrical bore 3, terminating at its forward end in a frustro-conical bore 4, the smaller end of said frusto-conical bore terminating in a reduced cylindrical bore 5, which latter may be the outlet to the nozzle of the faucet of a lavatory for instance, or of a bath tub. The cylindrical bore 3 is provided with an annular series of longitudinal spaced inwardly projecting ribs or fins 6. The frusto-conical bore 4 and the reduced cylindrical bore 5 may be formed in an insert 5', the inner end of which abuts against the adjacent ends of said ribs 6.

Working in the chamber of said valve casing is an elongated pressure-responsive float valve, the material of which may be similar to that used for automobile tire treads, although obviously other equivalent resilient material may be used. This valve comprises a cylindrical portion 7, of slightly less diameter than that of the space between the ribs 6, within which ribs it works slidably; and a frusto-conical end portion 8, having a flare less than that of the frusto-conical bore 4, to provide an annular space 9 communicating with the spaces 10 between said ribs 6 for passage of fluid. This valve 7 terminates at the smaller end of its frusto-conical end portion in a rounded nose 11, the arcuate elements of which merge into the straight elements of said frusto-conical end portion 8.

The rear end of the valve casing is provided with a disk insert 12, provided with a central opening 13, the diameter of which should be somewhat greater than that of the reduced cylindrical bore 5, to facilitate passage of fluid. This insert also serves to confine the valve within its chamber.

The valve is provided with a rear wall 14, located at right angles to its longitudinal axis, thereby providing an abutment for pressure of the fluid to drive the valve forwardly to its seat. The rear face of the valve is provided with a transverse notch 15, to allow water to drain back when the main line is cut off, that is to say when the valve is located with its rear face in contact with said insert 12.

The valve being driven or forced forwardly by fluid pressure, as aforesaid, its rounded nose 11 will center the valve with respect to the reduced cylindrical bore 5, and the valve will become resiliently deformed to compress and elongate its rounded nose 11 and the adjoining smaller end of its frusto-conical end portion 8 to contact and plug a circular valve seat zone 5" of said reduced cylindrical bore as shown in Fig. 3.

In order to open the valve, in the application of the invention shown in the drawings, a push rod 16 is provided, said rod having threaded engagement at 17 with a threaded opening of nozzle 18, said nozzle having threaded engagement with the forward end of the valve casing 1. This push rod at its inner end is cupped at 16' to engage the nose of the valve and push the valve rearwardly against fluid pressure into open position, where the valve will be held by the push rod against fluid pressure during passage of fluid into said nozzle. The diameter of the push rod is sufficiently less than that of the bore 5 to permit ready flow of the fluid when the valve is open.

The push rod is provided with an outer handle

18', and within the nozzle chamber this push rod is provided with a deflector disk 19, serving to deflect the stream of water issuing from bore 5.

Further relative to the material used for the float valve, the best results would be obtained if the grade of rubber used were similar to that used for automobile tire treads, this working well under 50 to 100 pounds fluid pressure. The lower the pressure, the more resilient the rubber used must be, and vice versa. In some cases a good grade of cork may be used for this purpose.

I claim:

1. In a valve closure, the combination with a valve casing having a cylindrical bore provided with a plurality of spaced longitudinal inwardly projecting ribs, a frusto-conical bore and a reduced cylindrical bore; of a pressure-responsive float valve of resilient material having a cylindrical body slidably engaging said ribs, a frusto-conical end portion of a flare less than that of said frusto-conical bore to provide an annular space communicating with the spaces between said ribs for passage of fluid, and a rounded nose the arcuate elements of which merge into the straight elements of said frusto-conical end portion, said valve being driven forward and being resiliently deformable under fluid pressure to compress and elongate said rounded nose and the adjoining smaller end of said frusto-conical end portion to contact and plug a circular valve seat zone of said reduced cylindrical bore, said rounded nose serving to center the valve with respect to said reduced bore.

2. In a valve closure, the combination with a valve casing having a cylindrical bore provided with a plurality of spaced longitudinal inwardly projecting ribs, a frusto-conical bore and a reduced cylindrical bore; of a pressure-responsive float valve of resilient material having a cylindrical body slidably engaging said ribs, a frusto-conical end portion of a flare less than that of said frusto-conical bore to provide an annular space communicating with the spaces between said ribs for passage of fluid, and a rounded nose the arcuate elements of which merge into the straight elements of said frusto-conical end portion, said valve being subject to being driven forward and being resiliently deformable under fluid pressure to compress and elongate the said rounded nose and the adjoining smaller end of said frusto-conical end portion to contact and plug a circular valve seat zone of said reduced cylindrical bore, said rounded nose serving to center the valve with respect to said reduced bore, the rear end of said valve having a wall located at right angles to its longitudinal axis providing an abutment for pressure of fluid, the rear end of said valve casing having a disk insert provided with a central opening for inlet of fluid, said insert confining the valve to its chamber.

3. In a valve closure, the combination with a valve casing having a cylindrical bore provided with a plurality of spaced longitudinal ribs, a frusto-conical bore and a reduced cylindrical bore; of a pressure-responsive float valve of resilient material having a cylindrical body slidably engaging said ribs, a frusto-conical end portion of a flare less than that of said frusto-conical bore to provide an annular space communicating with the spaces between said ribs for passage of fluid, and a rounded nose the arcuate elements of which merge into the straight elements of said frusto-conical end portion, said valve being subject to being driven forward and being resiliently deformable under fluid pressure to compress and elongate said rounded nose and the adjoining smaller end of said frusto-conical end portion to contact and plug a circular valve seat zone of said reduced cylindrical bore, said rounded nose serving to center the valve with respect to said reduced bore, and a push rod for opening the valve, said rod having at its inner end engagement with said rounded nose to retract the valve from seating position.

4. In a valve closure, the combination with a valve casing having a cylindrical bore provided with a plurality of spaced longitudinal ribs, a frusto-conical bore and a reduced cylindrical bore; of a pressure-responsive float valve of resilient material having a cylindrical body slidably engaging said ribs, a frusto-conical end portion of a flare less than that of said frusto-conical bore to provide an annular space communicating with the spaces between said ribs for passage of fluid, and a rounded nose the arcuate elements of which merge into the straight elements of said frusto-conical end portion, said valve being capable of being driven forward and resiliently deformable under fluid pressure to compress and elongate said rounded nose and the joining smaller end of said frusto-conical end portion to contact and plug a circular valve seat zone of said reduced cylindrical bore, said rounded nose serving to center the valve with respect to said reduced bore, and a push rod for opening the valve, said rod having at its inner end engagement with said rounded nose to retract the valve from seating position against pressure of the fluid, said rod having a diameter smaller than that of said reduced bore to admit of ready passage of the fluid, said rod having a deflector for the stream of fluid issuing from said reduced bore.

CHARLES F. ZIMMERMAN.

REFERENCES CITED

The following references are of record in the file of this patent:

UNITED STATES PATENTS

| Number | Name | Date |
|---|---|---|
| 542,024 | McIlhenny | July 2, 1895 |
| 950,026 | Peterson | Feb. 27, 1910 |
| 2,375,498 | Seymour | May 8, 1945 |